US011234229B2

(12) United States Patent
Zhang et al.

(10) Patent No.: US 11,234,229 B2
(45) Date of Patent: Jan. 25, 2022

(54) RESOURCE SCHEDULING METHOD, USER EQUIPMENT, AND ACCESS NETWORK DEVICE

(71) Applicant: HUAWEI TECHNOLOGIES CO., LTD., Shenzhen (CN)

(72) Inventors: Xu Zhang, Beijing (CN); Lixia Xue, Beijing (CN); Jianqin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 16/523,990

(22) Filed: Jul. 26, 2019

(65) Prior Publication Data

US 2019/0349912 A1 Nov. 14, 2019

Related U.S. Application Data

(63) Continuation of application No. PCT/CN2018/074004, filed on Jan. 24, 2018.

(30) Foreign Application Priority Data

Jan. 26, 2017 (CN) .......................... 201710062844.2

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04W 72/0446* (2013.01); *H04W 72/0453* (2013.01)

(58) Field of Classification Search
CPC ........... H04W 72/042; H04W 72/0446; H04W 72/0453; H04L 5/0053
See application file for complete search history.

(56) References Cited

U.S. PATENT DOCUMENTS

2010/0115358 A1* 5/2010 Kotecha ................ H04L 1/1812
714/748
2010/0323740 A1 12/2010 Hunt et al.
(Continued)

FOREIGN PATENT DOCUMENTS

CN 101909327 A 12/2010
CN 101940052 A 1/2011
(Continued)

*Primary Examiner* — Jael M Ulysse
(74) *Attorney, Agent, or Firm* — Hauptman Ham, LLP

(57) ABSTRACT

Embodiments provide resource scheduling method, user equipment, and an access network device. The method includes: receiving, by user equipment over a first control channel, first indication information corresponding to a transport block, where time-frequency resources occupied by a data channel in which the transport block is located include a first resource set and a second resource set, and the first indication information is used to indicate the first resource set and a time-frequency resource of a second control channel; receiving, by the user equipment, second indication information over the second control channel, where the second indication information is used to indicate the second resource set; and determining, by the user equipment, the transport block based on the first resource set and the second resource set. This can reduce control signaling overheads and improve flexibility of control channel resource scheduling.

20 Claims, 5 Drawing Sheets

(56) References Cited

U.S. PATENT DOCUMENTS

| | | | | |
|---|---|---|---|---|
| 2011/0064115 A1* | 3/2011 | Xu | H04L 5/0094 | 375/130 |
| 2011/0206014 A1* | 8/2011 | Lee | H04L 1/1861 | 370/335 |
| 2012/0177096 A1* | 7/2012 | Yano | H04L 1/0057 | 375/224 |
| 2012/0263047 A1* | 10/2012 | Love | H04L 1/0025 | 370/252 |
| 2013/0034072 A1* | 2/2013 | Kim | H03M 13/6536 | 370/329 |
| 2013/0039272 A1* | 2/2013 | Chen | H04W 72/042 | 370/328 |
| 2013/0044727 A1* | 2/2013 | Nory | H04L 5/0092 | 370/330 |
| 2013/0083747 A1* | 4/2013 | Narasimha | H04W 56/0045 | 370/329 |
| 2013/0195041 A1* | 8/2013 | Papasakellariou | H04L 1/0038 | 370/329 |
| 2013/0250882 A1* | 9/2013 | Dinan | H04L 5/0032 | 370/329 |
| 2013/0294369 A1* | 11/2013 | Dinan | H04W 72/0466 | 370/329 |
| 2013/0308504 A1* | 11/2013 | Nimbalker | H04L 5/003 | 370/281 |
| 2013/0343238 A1* | 12/2013 | Seo | H04L 5/0053 | 370/280 |
| 2014/0204812 A1* | 7/2014 | Li | H04L 5/0007 | 370/280 |
| 2014/0321422 A1* | 10/2014 | Choi | H04L 5/0055 | 370/330 |
| 2014/0376456 A1* | 12/2014 | Kim | H04L 1/18 | 370/329 |
| 2015/0131565 A1* | 5/2015 | Nakashima | H04L 1/0026 | 370/329 |
| 2016/0149672 A1* | 5/2016 | Shimezawa | H04L 1/1607 | 370/329 |
| 2016/0192388 A1* | 6/2016 | Ekpenyong | H04L 1/1829 | 370/329 |
| 2016/0234860 A1* | 8/2016 | Shimezawa | H04L 5/0053 | |
| 2017/0134236 A1* | 5/2017 | Patel | H04W 74/004 | |

FOREIGN PATENT DOCUMENTS

| | | |
|---|---|---|
| CN | 102577471 A | 7/2012 |
| CN | 103780353 A | 5/2014 |
| EP | 2670065 A2 | 12/2013 |

\* cited by examiner

RESOURCE SCHEDULING METHOD, USER EQUIPMENT, AND ACCESS NETWORK DEVICE

CROSS-REFERENCE TO RELATED APPLICATIONS

This application is a continuation of International Application No. PCT/CN2018/074004, filed on Jan. 24, 2018, which claims priority to Chinese Patent Application No. 201710062844.2, filed on Jan. 26, 2017. The disclosures of the aforementioned applications are hereby incorporated by reference in their entireties.

TECHNICAL FIELD

The present invention relates to the field of communications technologies, and in particular, to a resource scheduling method, user equipment, and an access network device.

BACKGROUND

An access network device usually indicates, to user equipment, a time-frequency resource of a data channel by sending control information. The time-frequency resource of the data channel carries data information sent to the user equipment.

In a next generation communications system (5G), an access bandwidth changes dynamically, and a format of control information for resource allocation varies with the access bandwidth. For example, when the access bandwidth is 5 MHz, a size of indication information for indicating a data channel resource is 13 bits; and when the access bandwidth is 10 MHz, the size of the indication information for indicating the data channel resource is 17 bits. The sizes of the indication information are different for different access bandwidths. In addition, as a system bandwidth increases, a length of indication information bits in control signaling increases. Consequently, more control channel resources are occupied and higher overheads are caused.

SUMMARY

Embodiments of the present invention provide a resource scheduling method, user equipment, and an access network device, to reduce complexity of control channel blind detection and reduce control signaling overheads.

According to a first aspect, an embodiment of the present invention provides a resource scheduling method. The method includes: receiving, by user equipment over a first control channel, first indication information corresponding to a transport block, where time-frequency resources occupied by a data channel in which the transport block is located include a first resource set and a second resource set, and the first resource indication information is used to indicate the first resource set and a time-frequency resource of a second control channel; receiving, by the user equipment, second indication information over the second control channel, where the second indication information is used to indicate the second resource set; and determining, by the user equipment, the transport block based on the first resource set and the second resource set.

According to the resource scheduling method provided in this embodiment of the present invention, the second control channel occupies some data channel resources. This can alleviate control channel resource shortage. In addition, resource indication of the data channel in which the transport block is located is performed by using two-level resource indication information. In this way, control signaling overheads of first resource indication are sufficiently low, and no blind detection needs to be performed on the first resource indication information, thereby reducing control signaling overheads and blind detection complexity. In addition, the first resource indication information indicates indication information indicating a time-frequency resource location, a format, and the like of the second control channel. Therefore, no blind detection needs to be performed on the second control channel, further reducing complexity of control channel blind detection.

In one implementation, a maximum bandwidth of the first resource set in frequency domain is less than a maximum bandwidth of the second resource set in frequency domain.

Optionally, a bandwidth of the user equipment may be divided into two parts for separate indication. The first resource indication information indicates the first resource set within a first bandwidth, and the second resource indication information indicates the second resource set within a second bandwidth. The first bandwidth and the second bandwidth can be flexibly configured. For example, the first bandwidth is a narrow bandwidth, and the second bandwidth is a wide bandwidth.

In one implementation, the first resource set includes m first frequency domain resource groups, and the m first frequency domain resource groups are in a one-to-one correspondence with m consecutive first numbers; and the second resource set includes n second frequency domain resource groups, and the n second frequency domain resource groups are in a one-to-one correspondence with n consecutive second numbers, where an end number of the m consecutive first numbers is consecutive to a start number of the n consecutive second numbers, or a start number of the m consecutive first numbers is consecutive to an end number of the n consecutive second numbers, where m and n are integers greater than 0.

In one implementation, that the first indication information is used to indicate the first resource set includes: the first indication information includes a first index value, and the first index value is used to indicate the start number of the m consecutive first numbers and a value of m, where a quantity of candidate values of the first index value is predefined or configurable.

Optionally, that the quantity of candidate values of the first index value may be predefined means that a frequency band width of the maximum bandwidth of the first resource set in frequency domain may be predefined. For example, if a frequency band width of the first bandwidth (narrow bandwidth) is predefined to be fixed, the quantity of candidate values of the first index value is fixed.

In one implementation, the second indication information is used to indicate that the end number of the m consecutive first numbers is consecutive to the start number of the n consecutive second numbers, and indicate a value of n; or the second indication information is used to indicate that the start number of the m consecutive first numbers is consecutive to the end number of the n consecutive second numbers, and indicate a value of n.

In one implementation, that the first indication information is used to indicate the first resource set includes: the first indication information includes a first index value, and the first index value is used to indicate the start number of the m consecutive first numbers and a value of m, where a quantity of candidate values of the first index value is predefined or configurable; and that the second indication information is used to indicate the second resource set includes: the second indication information includes a second index value, and the second index value is used to indicate the start number of the n consecutive second numbers and a value of n, where a quantity of candidate values of the second index value is predefined or configurable.

Optionally, that the quantity of candidate values of the first index value may be predefined means that a frequency band width of the maximum bandwidth of the first resource set in frequency domain may be predefined. For example, if a frequency band width of the first bandwidth (narrow bandwidth) is predefined to be fixed, the quantity of candidate values of the first index value is fixed.

Optionally, that the quantity of candidate values of the second index value may be predefined means that a frequency band width of the maximum bandwidth of the first resource set in frequency domain may be predefined. For example, a frequency band width of the second bandwidth (wide bandwidth) may be predefined to be fixed depending on an actual need, and the quantity of candidate values of the second index value is variable.

In one implementation, a correspondence between the first index value and the m consecutive first numbers, a correspondence between the second index value and the m consecutive first numbers, and a correspondence between the second index value and the n second numbers are determined based on a pre-configured tree structure relationship.

Optionally, a format of the first indication information or the second indication information may be further set based on pre-configured tree structure correspondences between the frequency domain resource group numbers and the index values, to implement two-level resource indication. In this way, resource scheduling flexibility can be improved when control signaling overheads are sufficiently small.

In one implementation, the first resource set includes m first frequency domain resource groups, and the m first frequency domain resource groups are in a one-to-one correspondence with m first numbers; and the second resource set includes n second frequency domain resource groups, and the n second frequency domain resource groups are in a one-to-one correspondence with n second numbers, where the m first numbers and the n second numbers meet one or more of the following conditions: them first numbers are discrete numbers; the n second numbers are discrete numbers; the m first numbers are consecutive numbers, the n second numbers are consecutive numbers, and an end number of the m first numbers is consecutive to a start number of the n second numbers, or a start number of the m first numbers is consecutive to an end number of the n second numbers; and the m first numbers are consecutive numbers, the n second numbers are consecutive numbers, and the end number of the m first numbers is inconsecutive to the start number of the n second numbers, or the start number of the m first numbers is inconsecutive to the end number of the n second numbers, where m and n are integers greater than 0.

In one implementation, that the first indication information is used to indicate the first resource set includes: the first indication information includes a first bitmap, and the first bitmap is used to indicate locations of the m first frequency domain resource groups; and that the second indication information is used to indicate the second resource set includes: the second indication information includes a second bitmap, and the second bitmap is used to indicate locations of the n second frequency domain resource groups.

In one implementation, when the m first numbers and the n second numbers meet the condition that the m first numbers are consecutive numbers, the n second numbers are consecutive numbers, and the end number of the m first numbers and the start number of the n second numbers are discrete, or the start number of the m first numbers and the end number of the n second numbers are discrete, that the first indication information is used to indicate the first resource set includes: the first indication information includes a first index value, and the first index value indicates the start number of the m consecutive first numbers and a value of m, where a quantity of candidate values of the first index value is predefined or configurable; and that the second indication information is used to indicate the second resource set includes: the second indication information includes a second index value, and the second index value indicates the start number of the n consecutive second numbers and a value of n, where a quantity of candidate values of the second index value is predefined or configurable.

In one implementation, when the m first numbers and the n second numbers meet a condition that the m first numbers are discrete numbers and the n second numbers are consecutive numbers, that the first indication information is used to indicate the first resource set includes: the first indication information includes a first bitmap, and the first bitmap is used to indicate locations of the m first frequency domain resource groups; and that the second indication information is used to indicate the second resource set includes: the second indication information includes a second index value, and the second index value indicates the start number of the n consecutive second numbers and a value of n, where a quantity of candidate values of the second index value is predefined or configurable.

In one implementation, when the m first numbers and the n second numbers meet a condition that the m first numbers are consecutive numbers and the n second numbers are discrete numbers, that the first indication information is used to indicate the first resource set includes: the first indication information includes a first index value, and the first index value indicates the start number of the m consecutive first numbers and a value of m, where a quantity of candidate values of the first index value is predefined or configurable; and that the second indication information is used to indicate the second resource set includes: the second indication information includes a second bitmap, and the second bitmap is used to indicate locations of the n second frequency domain resource groups.

Optionally, the frequency domain resource group may be indicated by using a bitmap. Discrete frequency domain resource units may be regrouped and indicated on a basis of previous grouping, so as to reduce control signaling overheads.

Optionally, if the m first numbers are consecutive, or the n second numbers are consecutive, or the m first numbers are consecutive, the n second numbers are consecutive, and the start (end) number of the m first numbers is consecutive to the end (start) number of the n second numbers, consecutive numbers may be indicated by using an index value, to perform resource scheduling. If the m first numbers are consecutive, or the n second numbers are inconsecutive, or the start (end) number of the m first numbers is inconsecutive to the end (start) number of the n second numbers, discrete numbers may be indicated by using a bitmap, to perform resource scheduling. Indication by using an index value, or indication of regrouped discrete numbers by using a bitmap can reduce resource indication overheads and resource indication complexity.

In one implementation, each of the m first frequency domain resource groups includes k1 frequency domain resource units, and each of the n second frequency domain resource groups includes k2 frequency domain resource units, where k1 and k2 are determined based on an access bandwidth of the user equipment in frequency domain, k1 and k2 are positive integers greater than or equal to 1, and k1 is less than or equal to k2.

Optionally, the frequency domain resource unit may be a PRB or an RB. A resource granularity of a frequency domain resource group within the first bandwidth may be different from a resource granularity of a frequency domain resource group within the second bandwidth. For example, when the second bandwidth is a wide bandwidth, the resource granularities of the two bandwidths may be flexibly configured. A resource granularity of the wide bandwidth may be greater than or equal to that of a narrow bandwidth.

In one implementation, k1 is determined by a size of the frequency domain resource occupied by the second control channel.

Optionally, it may be ensured that a resource granularity of the second control channel matches a resource granularity of the first resource set as much as possible. This can reduce resource fragments generated when the second control channel and the first resource set share a resource in frequency domain, and ensure that a resource of the first resource set scheduled for the second control channel has relatively good channel quality, thereby improving transmission reliability of the second control channel and/or reducing overheads of the resource occupied by the second control channel.

According to a second aspect, an embodiment of the present invention provides a resource scheduling method. The method includes: determining, by an access network device, time-frequency resources occupied for sending a data channel in which a transport block is located, where the time-frequency resources include a first resource set and a second resource set; sending, by the access network device over a first control channel, first indication information corresponding to the transport block, where the first indication information is used to indicate the first resource set and a time-frequency resource of a second control channel; and sending, by the access network device, second indication information over the second control channel, where the second indication information is used to indicate the second resource set.

In one implementation, a maximum bandwidth of the first resource set in frequency domain is less than a maximum bandwidth of the second resource set in frequency domain.

Optionally, when the access network device sends the transport block to user equipment, the transport block may occupy time-frequency resources within two bandwidths. In this way, channel resources can be flexibly scheduled and used. In addition, two-level indication is used for the channel resources, thereby reducing control signaling overheads. Moreover, some data channel resources may be shared as control channel resources, alleviating shortage of control channel resources.

According to a third aspect, an embodiment of the present invention provides user equipment. The user equipment includes: a receiving unit, configured to receive, over a first control channel, first indication information corresponding to a transport block, where time-frequency resources occupied by a data channel in which the transport block is located include a first resource set and a second resource set, and the first indication information is used to indicate the first resource set and a time-frequency resource of a second control channel, where the receiving unit is further configured to receive second indication information over the second control channel, where the second indication information is used to indicate the second resource set; and a processing unit, configured to determine the transport block based on the first resource set and the second resource set.

In one implementation, a maximum bandwidth of the first resource set in frequency domain is less than a maximum bandwidth of the second resource set in frequency domain.

In one implementation, the first resource set includes m first frequency domain resource groups, and the m first frequency domain resource groups are in a one-to-one correspondence with m consecutive first numbers; and the second resource set includes n second frequency domain resource groups, and the n second frequency domain resource groups are in a one-to-one correspondence with n consecutive second numbers, where an end number of the m consecutive first numbers is consecutive to a start number of the n consecutive second numbers, or a start number of the m consecutive first numbers is consecutive to an end number of the n consecutive second numbers, where m and n are integers greater than 0.

In one implementation, that the first indication information is used to indicate the first resource set includes: the first indication information includes a first index value, and the first index value is used to indicate the start number of the m consecutive first numbers and a value of m, where a quantity of candidate values of the first index value is predefined or configurable.

In one implementation, the second indication information is used to indicate that the end number of the m consecutive first numbers is consecutive to the start number of the n consecutive second numbers, and indicate a value of n; or the second indication information is used to indicate that the start number of the m consecutive first numbers is consecutive to the end number of the n consecutive second numbers, and indicate a value of n.

In one implementation, that the first indication information is used to indicate the first resource set includes: the first indication information includes a first index value, and the first index value is used to indicate the start number of the m consecutive first numbers and a value of m, where a quantity of candidate values of the first index value is predefined or configurable; and that the second indication information is used to indicate the second resource set includes: the second indication information includes a second index value, and the second index value is used to indicate the start number of the n consecutive second numbers and a value of n, where a quantity of candidate values of the second index value is predefined or configurable.

In one implementation, a correspondence between the first index value and the m consecutive first numbers, a correspondence between the second index value and the m consecutive first numbers, and a correspondence between the second index value and the n second numbers are determined based on a pre-configured tree structure relationship.

In one implementation, the first resource set includes m first frequency domain resource groups, and the m first frequency domain resource groups are in a one-to-one correspondence with m first numbers; and the second resource set includes n second frequency domain resource groups, and the n second frequency domain resource groups are in a one-to-one correspondence with n second numbers, where the m first numbers and the n second numbers meet one or more of the following conditions: them first numbers are discrete numbers; the n second numbers are discrete numbers; the m first numbers are consecutive numbers, the n second numbers are consecutive numbers, and an end number of the m first numbers is consecutive to a start number of the n second numbers, or a start number of the m first numbers is consecutive to an end number of the n second numbers; and the m first numbers are consecutive numbers, the n second numbers are consecutive numbers, and the end number of the m first numbers and the start number of the n second numbers are discrete, or the start number of the m first numbers and the end number of the n second numbers are discrete, where m and n are integers greater than 0.

In one implementation, that the first indication information is used to indicate the first resource set includes: the first indication information includes a first bitmap, and the first bitmap is used to indicate locations of the m first frequency domain resource groups; and that the second indication information is used to indicate the second resource set includes: the second indication information includes a second bitmap, and the second bitmap is used to indicate locations of the n second frequency domain resource groups.

In one implementation, when the m first numbers and the n second numbers meet the condition that the m first numbers are consecutive numbers, the n second numbers are consecutive numbers, and the end number of the m first numbers and the start number of the n second numbers are discrete, or the start number of the m first numbers and the end number of the n second numbers are discrete, that the first indication information is used to indicate the first resource set includes: the first indication information includes a first index value, and the first index value indicates the start number of the m consecutive first numbers and a value of m, where a quantity of candidate values of the first index value is predefined or configurable; and that the second indication information is used to indicate the second resource set includes: the second indication information includes a second index value, and the second index value indicates the start number of the n consecutive second numbers and a value of n, where a quantity of candidate values of the second index value is predefined or configurable.

In one implementation, when the m first numbers and the n second numbers meet a condition that the m first numbers are discrete numbers and the n second numbers are consecutive numbers, that the first indication information is used to indicate the first resource set includes: the first indication information includes a first bitmap, and the first bitmap is used to indicate locations of the m first frequency domain resource groups; and that the second indication information is used to indicate the second resource set includes: the second indication information includes a second index value, and the second index value indicates the start number of the n consecutive second numbers and a value of n, where a quantity of candidate values of the second index value is predefined or configurable.

In one implementation, when the m first numbers and the n second numbers meet a condition that the m first numbers are consecutive numbers and the n second numbers are discrete numbers, that the first indication information is used to indicate the first resource set includes: the first indication information includes a first index value, and the first index value indicates the start number of the m consecutive first numbers and a value of m, where a quantity of candidate values of the first index value is predefined or configurable; and that the second indication information is used to indicate the second resource set includes: the second indication information includes a second bitmap, and the second bitmap is used to indicate locations of the n second frequency domain resource groups.

In one implementation, each of the m first frequency domain resource groups includes k1 frequency domain resource units, and each of the n second frequency domain resource groups includes k2 frequency domain resource units, where k1 and k2 are determined based on an access bandwidth of the user equipment in frequency domain, k1 and k2 are positive integers greater than or equal to 1, and k1 is less than or equal to k2.

In one implementation, k1 is determined by a size of the frequency domain resource occupied by the second control channel.

According to a fourth aspect, an embodiment of the present invention provides an access network device. The access network device includes: a processing unit, configured to determine time-frequency resources occupied for sending a data channel in which a transport block is located, where the time-frequency resources include a first resource set and a second resource set; and a sending unit, configured to send, over a first control channel, first indication information corresponding to the transport block, where the first indication information is used to indicate the first resource set and a time-frequency resource of a second control channel, where the sending unit is further configured to send second resource indication information over the second control channel, where the second resource indication information is used to indicate the second resource set, and the sending unit is further configured to send the transport block by using the first resource set and the second resource set.

In one implementation, a maximum bandwidth of the first resource set in frequency domain is less than a maximum bandwidth of the second resource set in frequency domain.

According to a fifth aspect, an embodiment of the present invention provides a computer readable storage medium. A program instruction is stored in the computer readable storage medium, and when the program instruction runs on a computer, the computer is enabled to perform the method according to the first aspect or the second aspect.

Based on the foregoing technical solutions, the resource scheduling method, the user equipment, and the access network device that are provided in the embodiments of the present invention can reduce control signaling overheads and improve flexibility of control channel resource scheduling.

DESCRIPTION OF EMBODIMENTS

The following clearly and completely describes the technical solutions in the embodiments of the present invention with reference to the accompanying drawings in the embodiments of the present invention.

Figure 1:
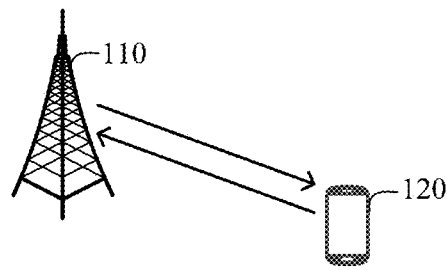
FIG. 1 is a schematic architectural diagram of a communications system according to an embodiment of the present invention.

FIG. 1 is a schematic architectural diagram of a communications system according to an embodiment of the present invention. As shown in FIG. 1, the communications system includes an access network device 110 and user equipment 120. Technologies described in the embodiments of the present invention can be used in a 5th generation (5th Generation, 5G) communications system, or other wireless communications systems using various radio access technologies, for example, a wireless local area network system, a worldwide interoperability for microwave access system, a global system for mobile communications, and wireless communications systems using access technologies such as code division multiple access, frequency division multiple access, time division multiple access, orthogonal frequency division multiple access, and single carrier frequency division multiple access. In addition, the technologies may also be applicable to a long term evolution (Long Term Evolution, LTE) system, a long term evolution advanced (Advanced long term evolution, LTE-A) system, and other subsequent LTE evolved systems.

The access network device provided in the embodiments of the present invention may be a network device deployed in a radio access network to provide a wireless communication function for the user equipment. The access network device may be a common base station, a new radio controller, a centralized network element, a new radio base station, a remote radio frequency module, a micro base station, a relay, a distributed network element, a reception point, a transmission point, or any other wireless access devices. The access network device 110 in FIG. 1 is only displayed as a base station for example, and this does not impose any limitation on the embodiments of the present invention.

The user equipment provided in various embodiments herein, also referred to as a terminal, is a device for providing voice and/or data connectivity for a user, for example, a handheld device, a vehicle-mounted device, a wearable device, or a computing device with a wireless communication function, another processing device connected to a wireless modem, or various forms of mobile stations, terminals, and terminal devices. Common user equipment includes, for example, a mobile phone, a tablet computer, a notebook computer, a palmtop computer, a mobile Internet device, a wearable device, a smartwatch, a smart band, and a pedometer.

In one embodiment, sufficiently flexible scheduling of a data channel needs to be implemented to ensure high transmission efficiency. However, a flexible scheduling scheme increases control information overheads. A spectrum utilization gain obtained by the system from high transmission efficiency decreases as the control information overheads continuously increase. Therefore, a design of control information needs to balance control signaling overheads and data channel scheduling flexibility.

In one embodiment, the access network device 110 sends data and control information to the user equipment 120. The control information may indicate scheduling information of a channel resource corresponding to the user equipment. Optionally, the user equipment 120 receives, over a first control channel, first indication information corresponding to a transport block (Transport Block, TB). Time-frequency resources occupied by a data channel in which the transport block is located include a first resource set and a second resource set. The first indication information is used to indicate the first resource set and a time-frequency resource of a second control channel. The user equipment receives second indication information over the second control channel. The second indication information is used to indicate the second resource set. The user equipment determines the transport block based on the first resource set and the second resource set. The first resource set and the second resource set each carry some information in the transport block.

In one example, the transport block includes data information A sent by the access network device 110 to the user equipment 120, or includes a physical layer transport block of an LTE system. In addition, the transport block may also include information obtained after cyclic redundancy check (Cyclic Redundancy Check, CRC) is added by the access network device 110 to the data information A, data obtained by performing channel coding on the data information A, data information obtained by scrambling the data information A, or the like. In one example, the transport block may also be referred to as a new transport block (New transport block), a code block (Code block), or another name with a similar meaning. Details are not described herein.

In one example, the first control channel is a channel that carries downlink control information (DCI) sent by the access network device 110 to the user equipment 120. For example, the first control channel may be a physical downlink control channel (PDCCH). In addition, the user equipment 120 may receive the transport block by using the first resource set and the second resource set. Therefore, the first resource set and the second resource set may also be understood as downlink transmission resources or data channel time-frequency resources.

In one example, the DCI may also be referred to as another name with a similar meaning. The PDCCH may also be referred to as another name with a similar meaning, for example, a new radio-PDCCH (NR-PDCCH), a 5G-PDCCH, or an xPDCCH. Details are not described herein.

In one example, a maximum bandwidth of the first resource set in frequency domain is less than a maximum bandwidth of the second resource set in frequency domain. Optionally, the bandwidth refers to resources that are consecutive in frequency domain but are not limited in time domain, for example, a 5 MHz bandwidth or a 10 MHz bandwidth. An access bandwidth refers to a size of a frequency domain resource configured by the access network device for the user equipment when the user equipment accesses the communications system. Access includes initial access of the user equipment, or handover of the user equipment from a source access network device to a target access network device, or a case in which the user equipment re-receives a system message from the access network device after being disconnected from the access network device, or the like. For example, the access bandwidth of the user equipment 120 is 20 MHz.

In some embodiments, the access bandwidth may be divided into two parts: a narrow bandwidth and a wide bandwidth. It should be understood that the narrow bandwidth and the wide bandwidth are relative concepts without absolute limitations. In one case, a bandwidth occupying fewer resources in frequency domain is the narrow bandwidth, and a bandwidth occupying more resources in frequency domain is the wide bandwidth, for example, a 5 MHz narrow bandwidth and a 15 MHz wide bandwidth. A frequency domain resource group set included in data channel transmission resources allocated to the user equipment 120 in the 5 MHz narrow bandwidth is the first resource set. A frequency domain resource group set included in data channel transmission resources allocated to the user equipment 120 in the 15 MHz wide bandwidth is the second resource set.

A frequency domain location of the narrow bandwidth within the access bandwidth may be indicated by the first indication information in the first control channel, and a frequency domain location of the wide bandwidth within the access bandwidth may be indicated by the second indication information in the second control channel. The user equipment determines locations of the first resource set and the second resource set based on the locations of the narrow bandwidth and the wide bandwidth in frequency domain, the first indication information, and the second indication information.

In one example, the first resource set or the second resource set may be divided into frequency domain resource groups, and each frequency domain resource group may include at least one frequency domain resource unit. The frequency domain resource unit herein may be a resource occupying P consecutive subcarriers in frequency domain, and is not defined in time domain, where P is a natural number greater than 1. For example, one frequency domain resource unit may occupy 12 consecutive subcarriers in frequency domain, where P=12. In addition, the frequency domain resource unit may also be referred to as a physical resource block (physical resource block, PRB) or a resource block (resource block, RB). Details are not described herein.

Figure 2:
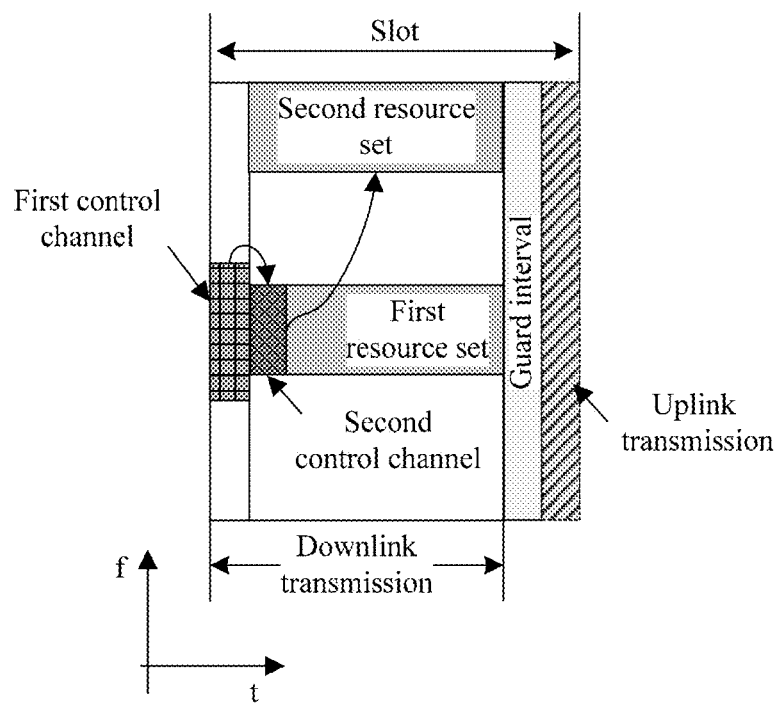
FIG. 2 is a schematic diagram of a resource scheduling spectrum according to an embodiment of the present invention.

Correspondingly, FIG. 2 is a schematic diagram of a resource scheduling spectrum according to an embodiment of the present invention. As shown in FIG. 2, in the communications system provided in the embodiments of the present invention, available resources of the user equipment 120 include a control channel resource, an uplink transmission resource, a downlink transmission resource, and a guard interval between the uplink transmission resource and the downlink transmission resource, and these resources are time-divided. In addition, the downlink transmission resources of the user equipment may be divided into a narrow bandwidth resource and a wide bandwidth resource in frequency domain. When the access network device 110 sends the transport block to the user equipment 120, the access network device 110 determines the transmission resources of the data channel based on obtained channel state information. Some of the transmission resources are the narrow bandwidth resources, and other transmission resources are the wide bandwidth resources. The access network device 110 sends downlink transmission resource usage to the user equipment 120 by using the first indication information and the second indication information, so that the user equipment 120 can receive the transport block on corresponding downlink transmission resources. The first indication information indicates usage of data channel resources within the narrow bandwidth, and the second indication information indicates usage of data channel resources within the wide bandwidth.

The access network device 110 sends the first indication information to the user equipment 120 over the first control channel. The first indication information indicates information about the first resource set and the second control channel. The second control channel may occupy a resource of the data channel transmission resources allocated by the access network device 110 to the user equipment 120 in the narrow bandwidth. Sharing the data channel resources by the second control channel can alleviate shortage of control channel resources. In addition, when the second control channel shares the data channel resources within the narrow bandwidth, time-frequency resources corresponding to the second control channel and the first resource set may be orthogonal to avoid interference between a control channel and a data channel.

In one embodiment, the resource scheduling method provided in the embodiments of the present invention may be applicable to scheduling of uplink transmission resources. The embodiments of the present invention are intended to reduce overheads of a first control channel resource. For example, some downlink data channel resources are extended as control channel resources, to alleviate shortage of control channel resources. Alternatively, the second control channel is sent on a resource of the first control channel and indicated by the first indication information, so that no blind detection is required, thereby reducing overheads of control channel blind detection. Therefore, the resource scheduling method provided in the embodiments of the present invention is not limited to scheduling downlink resources for the user equipment. A person skilled in the art may apply, depending on an actual condition, the resource scheduling method provided in the embodiments of the present invention to the technical field of uplink resource scheduling. The examples provided in the embodiments of the present invention are only used to describe the resource scheduling method in the embodiments of the present invention, and are not intended to impose any limitation on the embodiments of the present invention.

The communications system provided in various embodiments improves flexibility of control channel resource scheduling by using two-level resource indication: the first indication information and the second indication information. In addition, a fixed format of the first indication information may be configured, so that the user equipment does not need to perform blind detection on the first indication information. This can limit control signaling overheads to a sufficiently low level, and reduce complexity of detecting the first indication information by the user equipment. In addition, the first control channel further includes indication information indicating a time-frequency resource location, a format, and the like of the second control channel. Therefore, no blind detection needs to be performed on information about the second control channel either, further reducing complexity of control channel blind detection.

Figure 3:
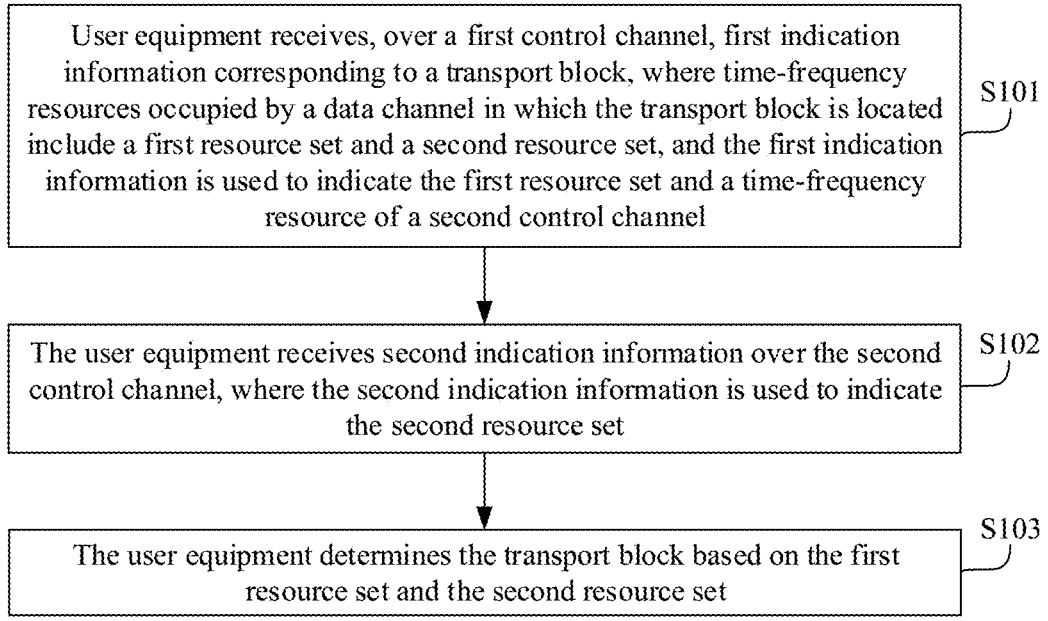
FIG. 3 is a schematic flowchart of a resource scheduling method according to an embodiment of the present invention.

Correspondingly, FIG. 3 is a schematic flowchart of a resource scheduling method according to an embodiment of the present invention. As shown in FIG. 3, steps S101 to S103 are included.

Step S101. User equipment receives, over a first control channel, first indication information corresponding to a transport block, where time-frequency resources occupied by a data channel in which the transport block is located include a first resource set and a second resource set, and the first indication information is used to indicate the first resource set and a time-frequency resource of a second control channel.

Step S102. The user equipment receives second indication information over the second control channel, where the second indication information is used to indicate the second resource set.

In one example, the first resource set includes m first frequency domain resource groups, and the m first frequency domain resource groups are in a one-to-one correspondence with m consecutive first numbers; and the second resource set includes n second frequency domain resource groups, and the n second frequency domain resource groups are in a one-to-one correspondence with n consecutive second numbers, where an end number of the m consecutive first numbers is consecutive to a start number of the n consecutive second numbers, or a start number of the m consecutive first numbers is consecutive to an end number of the n consecutive second numbers, where m and n are integers greater than 0.

In some embodiments, each frequency domain resource group may be numbered, and each number uniquely determines one group of frequency domain resources. Herein, "consecutive" in the consecutive first numbers or the consecutive second numbers mentioned in this embodiment of the present invention means continuity between numbers. For example, a number 1 and a number 2 are consecutive numbers, and the number 1 and a number 3 are discrete numbers. In this embodiment, that the m first (second) numbers corresponding to the m (n) first (second) frequency domain resource groups are consecutive does not mean that frequency domain resources corresponding to the m (n) first (second) frequency domain resource groups corresponding to the m first (second) numbers are consecutive in frequency domain.

In addition, when m is 1, a first number corresponding to the one first frequency domain resource group is consecutive to the start number of the n consecutive second numbers corresponding to then second frequency domain resource groups. When n is 1, the end number of the m consecutive first numbers corresponding to the m first frequency domain resource groups is consecutive to a second number corresponding to the one second frequency domain resource group.

Figure 4:
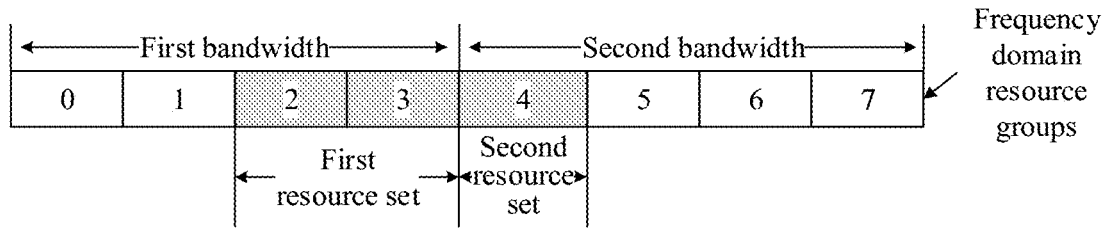
FIG. 4 is a schematic diagram of resource scheduling allocation according to an embodiment of the present invention.

Correspondingly, FIG. 4 is a schematic diagram of resource scheduling allocation according to an embodiment of the present invention. An access bandwidth of the user equipment includes T frequency domain resource groups in total. The T frequency domain resource groups may be numbered sequentially as frequency domain resource groups 0, 1, 2, . . . , and T−1, where T is a positive integer greater than 0.

In one example, the access bandwidth of the user equipment includes a first bandwidth and a second bandwidth. The first bandwidth and the second bandwidth may correspond to a narrow bandwidth and a wide bandwidth, respectively. As shown in FIG. 4, frequency domain resource groups 0 to 3 are time-frequency resources of the first bandwidth, and frequency domain resource groups 4 to 7 are time-frequency resources of the second bandwidth.

In one example, time-frequency resources, within the first bandwidth, occupied by the data channel in which the transport block is located are the first resource set, and time-frequency resources, within the second bandwidth, occupied by the data channel in which the transport block is located are the second resource set. As shown in FIG. 4, the time-frequency resources occupied by the data channel in which the transport block is located are frequency domain resource groups 2, 3, and 4. The frequency domain resource groups 2 and 3 are within the first bandwidth and are resources in the first resource set, while the frequency domain resource group 4 is within the second bandwidth and is a resource in the second resource set.

As shown in FIG. 4, the m first frequency domain resource groups included in the first resource set are first frequency domain resource groups 2 and 3. The m first numbers are 2 and 3, and in this case, m is 2. The n second frequency domain resource groups included in the second resource set are a second frequency domain resource group 4. The n second numbers are 4, and in this case, n is 1. In the m first numbers, the start number is 2 and the end number is 3. Currently, the end number (3) of the m first numbers is consecutive to the n (1) second numbers (4).

In addition, if the time-frequency resources occupied by the data channel in which the transport block is located further include other frequency domain resource groups shown in FIG. 4, for example, a frequency domain resource group 5, n is 2. FIG. 4 shows only one form of this embodiment of the present invention, and is not intended to limit the present invention.

In one example, that the first indication information is used to indicate the first resource set includes: the first indication information includes a first index value, and the first index value is used to indicate the start number of the m consecutive first numbers and a value of m, where a quantity of candidate values of the first index value is predefined or configurable.

In one example, the second indication information is used to indicate that the end number of the m consecutive first numbers is consecutive to the start number of the n consecutive second numbers, and indicate a value of n; or the second indication information is used to indicate that the start number of the m consecutive first numbers is consecutive to the end number of the n consecutive second numbers, and indicate a value of n.

As shown in FIG. 4, the first indication information includes a first index value, and the first index value is used to indicate a start number 2 of two consecutive first numbers, and that m=2; and the second indication information is used to indicate that an end number 3 of the two consecutive first numbers is consecutive to a second number 4, and that n=1. For details about a manner of setting the first index value or a second index value, refer to the embodiment in FIG. 5. Details are not described herein. In one example, a quantity of candidate values of the first index value is predefined or configurable. Correspondingly, a maximum bandwidth of the first resource set in frequency domain is predefined or configurable.

In one example, a correspondence between the first index value and the m consecutive first numbers, a correspondence between the second index value and the m consecutive first numbers, and a correspondence between the second index value and the n second numbers are determined based on a pre-configured tree structure relationship.

In one example, that the first indication information is used to indicate the first resource set includes: the first indication information includes a first index value, and the first index value is used to indicate the start number of the m consecutive first numbers and a value of m, where a quantity of candidate values of the first index value is predefined or configurable; and that the second indication information is used to indicate the second resource set includes: the second indication information includes a second index value, and the second index value is used to indicate the start number of the n consecutive second numbers and a value of n, where a quantity of candidate values of the second index value is predefined or configurable.

In some embodiments, that the quantity of candidate values of the second index value may be predefined means that a frequency band width of the maximum bandwidth of the first resource set in frequency domain may be predefined. For example, a frequency band width of the second bandwidth (wide bandwidth) may be predefined to be fixed depending on an actual need, and the quantity of candidate values of the second index value is variable.

In the foregoing embodiments, a correspondence between the first index value, the second index value, the first number, and the second number may be determined based on a pre-configured tree structure. For example, the first index value may correspond to the first number, and the second index value corresponds to the second number. Alternatively, the second index value may correspond to the first number and the second number. For details, refer to the following possible implementation in FIG. 5. In addition, whether the m first numbers in the first resource set are consecutive, whether the n second numbers in the second resource set are consecutive, and continuity between the m first numbers and the n second numbers may be determined based on a specific tree structure relationship. Only one possible tree structure relationship is shown in this embodiment of the present invention, and is not intended to impose any limitation on the embodiments of the present invention.

In one example, the first resource set includes m first frequency domain resource groups, and the m first frequency domain resource groups are in a one-to-one correspondence with m first numbers; and the second resource set includes n second frequency domain resource groups, and the n second frequency domain resource groups are in a one-to-one correspondence with n second numbers, where the m first numbers and the n second numbers meet one or more of the following conditions: the m first numbers are discrete numbers; the n second numbers are discrete numbers; and the m first numbers are consecutive numbers, the n second numbers are consecutive numbers, and an end number of the m first numbers is consecutive to a start number of the n second numbers, or a start number of the m first numbers is consecutive to an end number of the n second numbers, where m and n are integers greater than 0.

In one example, that the first indication information is used to indicate the first resource set includes: the first indication information includes a first bitmap (bitmap), and the first bitmap is used to indicate locations of the m first frequency domain resource groups; and that the second indication information is used to indicate the second resource set includes: the second indication information includes a second bitmap, and the second bitmap is used to indicate locations of the n second frequency domain resource groups.

In one example, when the m first numbers and the n second numbers meet a condition that the m first numbers are consecutive numbers, the n second numbers are consecutive numbers, and the end number of the m first numbers and the start number of the n second numbers are discrete, or the start number of the m first numbers and the end number of the n second numbers are discrete, that the first indication information is used to indicate the first resource set includes: the first indication information includes a first index value, and the first index value indicates the start number of the m consecutive first numbers and a value of m, where a quantity of candidate values of the first index value is predefined or configurable; and that the second indication information is used to indicate the second resource set includes: the second indication information includes a second index value, and the second index value indicates the start number of the n consecutive second numbers and a value of n, where a quantity of candidate values of the second index value is predefined or configurable.

In one example, when the m first numbers and the n second numbers meet a condition that the m first numbers are discrete numbers and the n second numbers are consecutive numbers, that the first indication information is used to indicate the first resource set includes: the first indication information includes a first bitmap, and the first bitmap is used to indicate locations of the m first frequency domain resource groups; and that the second indication information is used to indicate the second resource set includes: the second indication information includes a second index value, and the second index value indicates the start number of the n consecutive second numbers and a value of n, where a quantity of candidate values of the second index value is predefined or configurable.

In one example, when the m first numbers and the n second numbers meet a condition that the m first numbers are consecutive numbers and the n second numbers are discrete numbers, that the first indication information is used to indicate the first resource set includes: the first indication information includes a first index value, and the first index value indicates the start number of the m consecutive first numbers and a value of m, where a quantity of candidate values of the first index value is predefined or configurable; and that the second indication information is used to indicate the second resource set includes: the second indication information includes a second bitmap, and the second bitmap is used to indicate locations of the n second frequency domain resource groups. In one example, resources may be scheduled by using a bitmap. When the m first numbers in the first resource set are inconsecutive and the n second numbers in the second resource set are inconsecutive, or the m first numbers are inconsecutive to the n second numbers, discrete first numbers or second numbers may be re-grouped. For example, a new number 0 is assigned to discrete numbers 0 and 3, and resource indication is performed on the new number 0. In this way, a quantity of bits for bitmap indication can be reduced, and overheads of indication information can be reduced. In addition, if the m first numbers are consecutive but the n second numbers are discrete, the m first numbers may be indicated by using an index value, or if the m first numbers are discrete but the n second numbers are consecutive, the n first numbers may be indicated by using an index value, to further reduce a quantity of bits of the indication information.

In some embodiments, if the m first numbers are consecutive, or the n second numbers are consecutive, or the m first numbers are consecutive, the n second numbers are consecutive, and the start (end) number of the m first numbers is consecutive to the end (start) number of the n second numbers, consecutive numbers may be indicated by using an index value, to perform resource scheduling. If the m first numbers are consecutive, or the n second numbers are inconsecutive, or the start (end) number of the m first numbers is inconsecutive to the end (start) number of the n second numbers, discrete numbers may be indicated by using a bitmap, to perform resource scheduling. Indication by using an index value, or indication of regrouped discrete numbers by using a bitmap can reduce resource indication overheads and resource indication complexity. For details, refer to the following possible implementation in FIG. 6.

In the foregoing embodiment, whether the m first numbers in the first resource set are consecutive, whether the n second numbers in the second resource set are consecutive, and the continuity between the m first numbers and the n second numbers may be set based on a specific need. In an embodiment of the present invention, only an example in which discrete numbers are regrouped to reduce overheads of indication information is used to describe the embodiments of the present invention, and is not intended to impose any limitation on the embodiments of the present invention.

In one embodiment, the first resource set and the second resource set are data channel resources of the user equipment in frequency domain. Correspondingly, the first indication information indicates a data channel resource within the narrow bandwidth in frequency domain. Because the maximum bandwidth of the first resource set in frequency domain is limited, a size of bits occupied by the first indication information is ensured to be as small as possible. For example, the first indication information may be the first index value, or the first indication information may include the value of m and location information of a frequency domain resource unit corresponding to the start number of the m consecutive first numbers. In addition, the first indication information further includes information indicating the time-frequency resource of the second control channel, and information indicating whether the second indication information indicates the second resource set. In addition, a maximum bandwidth of the second resource set in frequency domain is variable (wide bandwidth). Correspondingly, a size of bits occupied by the second indication information is variable. In addition, the size of the first indication information may be fixed, so that the user equipment does not need to perform blind detection on the first indication information any more. Furthermore, indication information of the second indication information may also be indicated by the first indication information, and therefore no blind detection needs to be performed on the second indication information either.

In one example, each of the m first frequency domain resource groups includes k1 frequency domain resource units, and each of the n second frequency domain resource groups includes k2 frequency domain resource units, where k1 and k2 are determined based on an access bandwidth of the user equipment in frequency domain, k1 and k2 are positive integers greater than or equal to 1, and k1 is less than or equal to k2.

In one embodiment, the frequency domain resource unit may be one PRB. A resource granularity of the first frequency domain resource group and a resource granularity of the second frequency domain resource group may be pre-configured. To be specific, a specific correspondence table between the access bandwidth and values of k1 and k2 is pre-configured and stored; and then the values of k1 and k2 may be determined through table lookup.

In one embodiment, that each first frequency domain resource group includes k1 frequency domain resource units means that all first frequency domain resource units have a same resource granularity. Similarly, all second frequency domain resource units also have a same resource granularity. In addition, the resource granularity of the first frequency domain resource unit may be less than or equal to the resource granularity of the second frequency domain resource unit, that is, k1 is less than or equal to k2. In this embodiment of the present invention, the correspondence table between the access bandwidth and the specific values of k1 and k2 may be configured based on a specific need.

In one example, k1 is determined by a size of the frequency domain resource occupied by the second control channel.

In one embodiment, because the second control channel occupies some resources in the first resource set, it needs to be ensured that a resource granularity of the second control channel matches a resource granularity of the first resource set as much as possible. This can reduce resource fragments generated when the second control channel and the first resource set share a resource in frequency domain, and ensure that a resource of the first resource set scheduled for the second control channel has relatively good channel quality, thereby improving transmission reliability of the second control channel and/or reducing overheads of the resource occupied by the second control channel. Therefore, k1 is determined by the size of the frequency domain resource occupied by the second control channel.

Step S103. The user equipment determines the transport block based on the first resource set and the second resource set.

In one example, the user equipment receives, by using the first resource set and the second resource set, the transport block sent by an access network device. In one embodiment, a resource scheduling granularity in the first indication information is related to an aggregation level of the second control channel. The aggregation level is a quantity of control channel elements included in a control channel, and the control channel element includes one or more resource unit groups. The resource unit group includes H consecutive subcarriers in frequency domain, where H may be 12, 24, 48, or the like. For example, if one control channel element includes 12 consecutive subcarriers in frequency domain, and the aggregation level of the second control channel is 2, the resource scheduling granularity in the first indication information is two resource units in frequency domain, that is, two groups of 12 consecutive subcarriers in frequency domain.

Resource indication overheads produced in the two-level resource scheduling scheme provided in this embodiment of the present invention are the same as those produced in a single-level resource scheduling scheme. The resource scheduling method provided in this embodiment of the present invention can reduce control signaling overheads for two-level resource allocation (resource allocate, RA) as much as possible. For example, when the time-frequency resources occupied by the data channel in which the transport block is located do not include the second resource set, overheads for two-level RA are quite low. The resource scheduling method provided in this embodiment of the present invention can also maximize scheduling gains of the second indication information.

Correspondingly, FIG. 4 is a schematic diagram of resource scheduling allocation according to an embodiment of the present invention. As shown in FIG. 4, an access bandwidth of the user equipment includes T frequency domain resource groups in total. The T frequency domain resource groups may be numbered sequentially as frequency domain resource groups 0, 1, 2, . . . , and T−1, where T is a positive integer greater than 0.

In one example, the access bandwidth of the user equipment includes a first bandwidth and a second bandwidth. The first bandwidth and the second bandwidth may correspond to a narrow bandwidth and a wide bandwidth, respectively. Frequency domain resource groups 0 to 3 are time-frequency resources of the first bandwidth, and frequency domain resource groups 4 to 7 are time-frequency resources of the second bandwidth.

In one example, time-frequency resources, within the first bandwidth, occupied by the data channel in which the transport block is located are the first resource set, and time-frequency resources, within the second bandwidth, occupied by the data channel in which the transport block is located are the second resource set. As shown in FIG. 4, the time-frequency resources occupied by the data channel in which the transport block is located are frequency domain resource groups 2, 3, and 4. The frequency domain resource groups 2 and 3 are within the first bandwidth and are resources in the first resource set, while the frequency domain resource group 4 is within the second bandwidth and is a resource in the second resource set.

Figure 5:
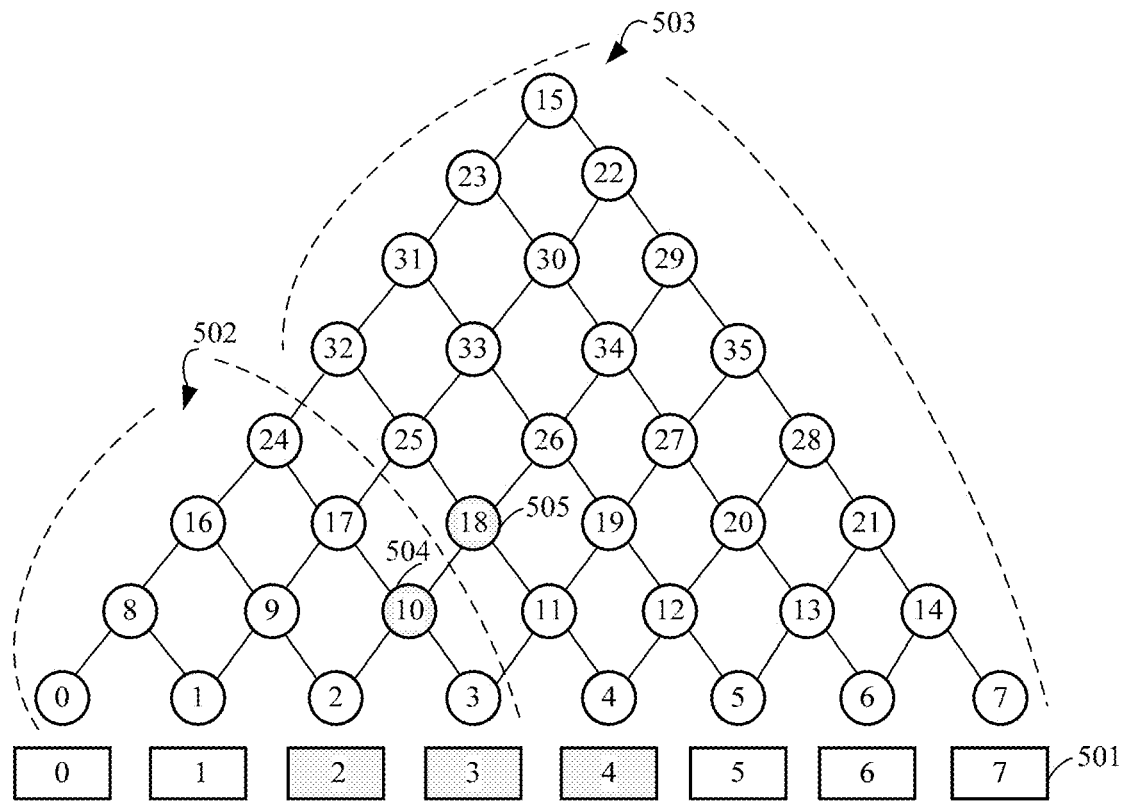
FIG. 5 is a schematic diagram of a tree structure in which a resource index value corresponds to a resource number according to an embodiment of the present invention.

Correspondingly, FIG. 5 is a schematic diagram of a tree structure in which a resource index value corresponds to a resource number according to an embodiment of the present invention. As shown in FIG. 5, in the tree structure, each node corresponds to one index value, and each index value corresponds to a number of a start frequency domain resource group and a quantity of consecutive frequency domain resource groups. Index values at a bottom layer are {0, 1, 2, 3, 4, 5, 6, 7}, and each index value at the bottom layer corresponds to one frequency domain resource group. For example, an index value 0 corresponds to a frequency domain resource group 0. The number of the start frequency domain resource group corresponds to a minimum-number node in a path extending from a node corresponding to an index value to a bottom layer node. The quantity of consecutive frequency domain resource groups is equal to a sum of 1 and a difference between numbers of a maximum-number node and a minimum-number node in a path extending from a node corresponding to an index value to a bottom layer node.

As shown in FIG. 5, 501 represents numbers of frequency domain resource groups. When a narrow bandwidth includes frequency domain resource groups 0 to 3, 502 represents the first index value. As shown by 502, a range of candidate values of the first index value is {0, 1, 2, 3, 8, 9, 10, 16, 17, 24}. It can be seen from the tree structure in FIG. 5 that in a tree branch corresponding to the first index value, the first index value may correspond to any one of the frequency domain resource groups 0 to 3. For example, the first index value 0 corresponds to the frequency domain resource group 0. The first index value 9 corresponds to the frequency domain resource groups 1 and 2. The first index value 24 corresponds to the frequency domain resource groups 1 to 3. In addition, when a wide bandwidth includes frequency domain resource groups 4 to 7, 503 represents the second index value. It can be seen from the tree structure in FIG. 5 that in a tree branch corresponding to the second index value, the second index value may correspond to any one of the frequency domain resource groups 0 to 7. The second index value 26 corresponds to the frequency domain resource groups 2 to 5.

In one embodiment, as shown in FIG. 5, when a bandwidth of the first bandwidth (narrow bandwidth) is fixed, that is, a quantity of frequency domain resource groups included in the first bandwidth is fixed, the quantity of candidate values of the first index value may be fixed. In FIG. 5, only an example in which the frequency domain resource groups 0 to 3 are included in the first bandwidth is used for description. In addition, a bandwidth of the second bandwidth (wide bandwidth) may not be fixed, that is, the access bandwidth of the user equipment is variable. Therefore, the quantity of candidate values of the second index value may not be fixed.

In one example, when a resource scheduling status of the user equipment meets the embodiment shown in FIG. 4, as shown in FIG. 5, 504 indicates that the user equipment may determine, based on a fact that the first index value is 10, frequency domain resource groups corresponding to a number 2 and a number 3, and 505 indicates that the user equipment may determine, based on a fact that the second index value is 18, a frequency domain resource group corresponding to a number 4. Specifically, information about the first index value and the second index value may be determined in the following manner.

In one embodiment, the access bandwidth of the user equipment includes the T frequency domain resource groups in total, and a correspondence between the first index value, and the number (denoted as Rstart) of the start first frequency domain resource group and the quantity (denoted as L1) of first frequency domain resource groups is expressed as follows: if $(L1-1) \leq T/2$, the first index value=$T \cdot (L1-1)$+Rstart; and if $(L1-1) > T/2$, the first index value=$T \cdot (T-L1+1)+(T-1-Rstart)$. In one example, in the tree structure shown in FIG. 5, the access network device determines that the first resource set includes the frequency domain resource groups 2 and 3, that is, Rstart=2 and L1=2. Because L1=2 and $L1-1 < T/2$, the first index value is $8 \cdot (2-1)+2=10$.

Therefore, the first indication information sent by the access network device may be: a first index value 10; or may be the number of the start first frequency domain resource group Rstart=2 and the quantity of first frequency domain resource groups L1=2. In addition, the first indication information may further indicate information, for example, a time-frequency location of the second control channel and whether the second control channel includes information indicating the second resource set.

In one example, the first indication information includes indication information indicating time-frequency location of the second control channel. There is a binding relationship between the time-frequency resource location of the second control channel and the first resource set. For example, a start location of the time-frequency resource of the second control channel is the same as a start location of the first resource set in frequency domain. In one implementation, if the first indication information indicates a size of the resource occupied by the second control channel and a time-frequency location of the first resource set, the user equipment may determine the time-frequency location of the second control channel based on the resource granularity of the second control channel and a binding relationship between the second control channel and the time-frequency location of the first resource set.

In one embodiment, a format of the first indication information is set, so that a quantity of bits occupied by the first indication information is fixed, for example, 5 bits. When the quantity of bits occupied by the first indication information is fixed, the user equipment does not need to perform blind detection on the first indication information. In addition, the user equipment may further determine, based on information, for example, whether the second control channel is indicated in the first indication information and whether the second control channel indicates the second resource set, whether the second resource set exists. When determining, based on the first indication information, that the second resource set exists, the user equipment receives the second indication information directly over the second control channel without performing blind detection.

In one embodiment, the second indication information includes the second index value. The second index value may be determined based on a quantity (which may be denoted as L2) of second frequency domain resource groups included in the second resource set. In addition, the second index value may also be determined based on the first index value and the quantity of second frequency domain resource groups. For example, L1 and Rstart may be determined based on the first index value, and L2 may be determined based on the second index value, L1, and Rstart. This is expressed as follows: if (L1+L2−1)≤T/2, the second index value=T·(L1+L2−1)+Rstart; and if (L1+L2−1)>T/2, the second index value=T·(T−L1−L2+1)±(T−1−Rstart). Locations of the second frequency domain resource groups within the second bandwidth may be further determined based on the second index value. In one example, if the access network device determines that the second resource set includes the frequency domain resource group 4, L2=1. Further, based on Rstart=2, L1=2, and L2=1, it can be concluded that the second index value is 8·(3−1)+2=18.

Therefore, the second indication information sent by the access network device may be the second index value 18 or the quantity of second frequency domain resource groups L2=1.

In one embodiment, the first indication information may indicate information, for example, the second control channel and whether the second control channel indicates the second resource set. For example, if the numbers of the frequency domain resource groups indicated by the first indication information include a number of a last frequency domain resource group within the first bandwidth, the second indication information includes information used to indicate the second resource set. If the numbers of the frequency domain resource groups indicated by the first indication information do not include the number of the last frequency domain resource group within the first bandwidth, the second indication information does not include the information used to indicate the second resource set. Optionally, as shown in FIG. 4 or FIG. 5, an end frequency domain resource group within the first bandwidth is the frequency domain resource group 3, and if the frequency domain resource groups indicated by the first index value include the frequency domain resource group 3, the second indication information includes the information used to indicate the second resource set. A value set of the first index value is {3, 10, 17, 24}. To be specific, if the first index value falls within the set {3, 10, 17, 24}, the second indication information needs to further indicate indication information of the second index value. If the first index value falls beyond {3, 10, 17, 24}, the second indication information does not include the indication information of the second index value.

According to the resource scheduling method provided in this embodiment of the present invention, for resource indication in the case of dynamic bandwidth change, resource indication information of a data channel is indicated by using two-level resource indication information. A length of first-level resource indication information remains unchanged, and second-level resource indication information changes dynamically. This effectively reduces complexity of detecting the first-level resource indication information by the user equipment. The first-level resource indication information indirectly indicates whether the second-level resource indication information exists, thereby reducing indication information overheads of the two-level resource scheme, and improving flexibility of control channel resource scheduling.

Figure 6:
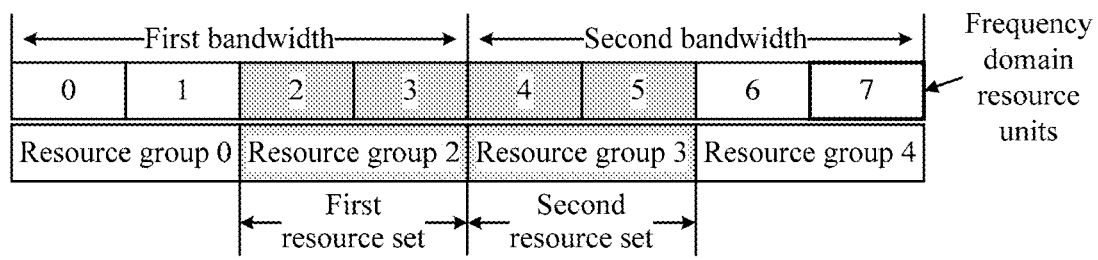
FIG. 6 is a schematic diagram of resource scheduling regrouping indication according to an embodiment of the present invention.

In one specific embodiment, FIG. 6 is a schematic diagram of resource scheduling regrouping indication according to an embodiment of the present invention. As shown in FIG. 6, in an example, the access bandwidth of the user equipment includes T frequency domain resource units in total. The T frequency domain resource groups may be numbered sequentially as frequency domain resource groups 0, 1, 2, . . . , and T−1, where T is a positive integer greater than 0. The frequency domain resource unit may be one PRB.

In one example, S frequency domain resource units may be combined into one frequency domain resource group, where S is a positive integer greater than 1. Numbers corresponding to the S frequency domain resource units may be consecutive or discrete. This is not limited in this embodiment of the present invention.

In some embodiments, as shown in FIG. 6, if the access bandwidth of the user equipment includes eight frequency domain resource units, the first resource set includes the frequency domain resource units 2 and 3, and the second resource set includes the frequency domain resource units 4 and 5, two frequency domain resource units may be combined into one frequency domain resource group. As shown in FIG. 6, the first bandwidth includes frequency domain resource groups 0 and 1, the second bandwidth includes frequency domain resource groups 2 and 3, the first resource set includes a frequency domain resource group 1, and the second resource set includes the frequency domain resource group 2.

In one example, resource scheduling indication may be performed by using a bitmap. For example, if a bit value of a frequency domain resource group corresponding to a number is 1, it indicates that the frequency domain resource group corresponding to the number belongs to the first resource set. Optionally, if bitmap indication information included in the first indication information is {0, 1}, it indicates that only the frequency domain resource group 2 within the first bandwidth is used for data channel transmission. Optionally, as shown in FIG. 6, the first indication information includes a first bitmap {0, 1}, and the second indication information includes a second bitmap {1, 0}.

In addition, FIG. 6 shows only one case of bitmap indication. Correspondingly, in FIG. 6, if the first resource set includes the frequency domain resource units 0 and 2, and the second resource set includes the frequency domain resource units 5 and 7, the frequency domain resource units 0 and 2 may be combined into a frequency domain resource group 0, and the frequency domain resource units 1 and 3 may be combined into a frequency domain resource group 1; and similarly, the frequency domain resource units 4 and 6 are combined into a frequency domain resource group 2, and the frequency domain resource units 5 and 7 are combined into a frequency domain resource group 3. The bitmap indication method provided in this embodiment of the present invention is further used to perform resource indication, so as to reduce a quantity of bitmap bits and reduce bit overheads of control signaling.

In some embodiments, compared with an existing case in which bitmap indication needs to be performed on each of the frequency domain resource groups 0 to 7, the resource scheduling method corresponding to FIG. 6 can significantly reduce a quantity of bits required for bitmap indication, and reduce control instruction overheads.

In one example, a resource granularity of a frequency domain resource group within the first bandwidth is less than or equal to a granularity of a frequency domain resource group within the second bandwidth.

In one example, the resource granularity of the frequency domain resource group within the first bandwidth is determined by the size of the frequency domain resource occupied by the second control channel. For example, a quantity of PRBs included in the frequency domain resource group within the first bandwidth may be exactly divided by a quantity of PRBs included in the second control channel. Optionally, if the quantity of PRBs included in the second control channel in frequency domain is 2, the quantity of PRBs included in the frequency domain resource group within the first bandwidth is 2 or 1.

In the resource scheduling method provided in this embodiment of the present invention, frequency domain resource groups are regrouped, thereby reducing a quantity of bits for bitmap indication, and reducing control instruction overheads. In addition, in this embodiment of the present invention, the two-level resource indication method may be used to implicitly indicate the second indication information in the first indication information. When the time-frequency resources occupied by the transport block do not include the second resource set, the user equipment may not receive or detect the second indication information based on the first indication information. This improves scheduling flexibility of the second indication information, and further reduces overheads of two-level resource indication information.

Figure 7:
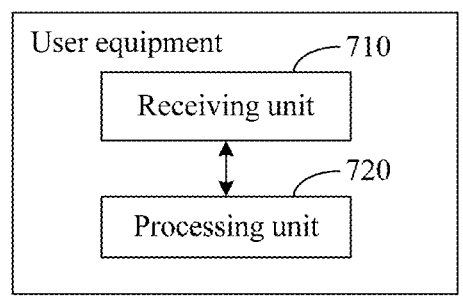
FIG. 7 is a schematic structural diagram of user equipment according to an embodiment of the present invention.

Correspondingly, an embodiment of the present invention provides user equipment, to implement the resource scheduling method provided in the foregoing embodiment. As shown in FIG. 7, the user equipment includes a receiving unit 710 and a processing unit 720.

The receiving unit 710 of the user equipment provided in this embodiment is configured to receive, over a first control channel, first indication information corresponding to a transport block, where time-frequency resources occupied by a data channel in which the transport block is located include a first resource set and a second resource set, and the first indication information is used to indicate the first resource set and a time-frequency resource of a second control channel.

The receiving unit 710 is further configured to receive second indication information over the second control channel, where the second indication information is used to indicate the second resource set.

The processing unit 720 is configured to determine the transport block based on the first resource set and the second resource set.

In one example, a maximum bandwidth of the first resource set in frequency domain is less than a maximum bandwidth of the second resource set in frequency domain.

In one example, the first resource set includes m first frequency domain resource groups, and the m first frequency domain resource groups are in a one-to-one correspondence with m consecutive first numbers; and the second resource set includes n second frequency domain resource groups, and the n second frequency domain resource groups are in a one-to-one correspondence with n consecutive second numbers, where an end number of the m consecutive first numbers is consecutive to a start number of the n consecutive second numbers, or a start number of the m consecutive first numbers is consecutive to an end number of the n consecutive second numbers, where m and n are integers greater than 0.

In one example, that the first indication information is used to indicate the first resource set includes: the first indication information includes a first index value, and the first index value is used to indicate the start number of the m consecutive first numbers and a value of m, where a quantity of candidate values of the first index value is predefined or configurable.

In one example, the second indication information is used to indicate that the end number of the m consecutive first numbers is consecutive to the start number of the n consecutive second numbers, and indicate a value of n; or the second indication information is used to indicate that the start number of the m consecutive first numbers is consecutive to the end number of the n consecutive second numbers, and indicate a value of n.

In one example, that the first indication information is used to indicate the first resource set includes: the first indication information includes a first index value, and the first index value is used to indicate the start number of the m consecutive first numbers and a value of m, where a quantity of candidate values of the first index value is predefined or configurable; and that the second indication information is used to indicate the second resource set includes: the second indication information includes a second index value, and the second index value is used to indicate the start number of the n consecutive second numbers and a value of n, where a quantity of candidate values of the second index value is predefined or configurable.

In one example, a correspondence between the first index value and the m consecutive first numbers, a correspondence between the second index value and the m consecutive first numbers, and a correspondence between the second index value and the n second numbers are determined based on a pre-configured tree structure relationship.

In one example, the first resource set includes m first frequency domain resource groups, and the m first frequency domain resource groups are in a one-to-one correspondence with m first numbers; and the second resource set includes n second frequency domain resource groups, and the n second frequency domain resource groups are in a one-to-one correspondence with n second numbers, where the m first numbers and the n second numbers meet one or more of the following conditions: the m first numbers are discrete numbers; the n second numbers are discrete numbers; the m first numbers are consecutive numbers, the n second numbers are consecutive numbers, and an end number of the m first numbers is consecutive to a start number of the n second numbers, or a start number of the m first numbers is consecutive to an end number of then second numbers; and the m first numbers are consecutive numbers, then second numbers are consecutive numbers, and the end number of the m first numbers is inconsecutive to the start number of the n second numbers, or the start number of the m first numbers is inconsecutive to the end number of the n second numbers, where m and n are integers greater than 0.

In one example, that the first indication information is used to indicate the first resource set includes: the first indication information includes a first bitmap, and the first bitmap is used to indicate locations of the m first frequency domain resource groups; and that the second indication information is used to indicate the second resource set includes: the second indication information includes a second bitmap, and the second bitmap is used to indicate locations of the n second frequency domain resource groups.

In one example, when the m first numbers and the n second numbers meet the condition that the m first numbers are consecutive numbers, the n second numbers are consecutive numbers, and the end number of the m first numbers is inconsecutive to the start number of the n second numbers, or the start number of the m first numbers is inconsecutive to the end number of the n second numbers, that the first indication information is used to indicate the first resource set includes: the first indication information includes a first index value, and the first index value indicates the start number of the m consecutive first numbers and a value of m, where a quantity of candidate values of the first index value is predefined or configurable; and that the second indication information is used to indicate the second resource set includes: the second indication information includes a second index value, and the second index value indicates the start number of the n consecutive second numbers and a value of n, where a quantity of candidate values of the second index value is predefined or configurable.

In one example, when the m first numbers and the n second numbers meet a condition that the m first numbers are discrete numbers and the n second numbers are consecutive numbers, that the first indication information is used to indicate the first resource set includes: the first indication information includes a first bitmap, and the first bitmap is used to indicate locations of the m first frequency domain resource groups; and that the second indication information is used to indicate the second resource set includes: the second indication information includes a second index value, and the second index value indicates the start number of the n consecutive second numbers and a value of n, where a quantity of candidate values of the second index value is predefined or configurable.

In one example, when the m first numbers and the n second numbers meet a condition that the m first numbers are consecutive numbers and the n second numbers are discrete numbers, that the first indication information is used to indicate the first resource set includes: the first indication information includes a first index value, and the first index value indicates the start number of the m consecutive first numbers and a value of m, where a quantity of candidate values of the first index value is predefined or configurable; and that the second indication information is used to indicate the second resource set includes: the second indication information includes a second bitmap, and the second bitmap is used to indicate locations of the n second frequency domain resource groups.

In one example, each of the m first frequency domain resource groups includes k1 frequency domain resource units, and each of the n second frequency domain resource groups includes k2 frequency domain resource units.

k1 and k2 are determined based on an access bandwidth of the user equipment in frequency domain, k1 and k2 are positive integers greater than or equal to 1, and k1 is less than or equal to k2.

In one example, k1 is determined by a size of the frequency domain resource occupied by the second control channel.

Figure 8:
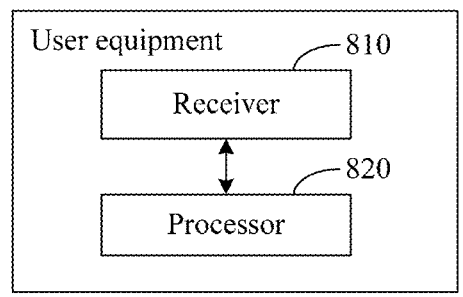
FIG. 8 is a schematic structural diagram of another user equipment according to an embodiment of the present invention.

In addition, the user equipment provided in this embodiment of the present invention may also be implemented in the following manner, to implement the resource scheduling method provided in the foregoing embodiment of the present invention. As shown in FIG. 8, the user equipment includes a receiver 810 and a processor 820.

In an optional embodiment, the receiving unit 710 in the foregoing embodiment in FIG. 7 may be implemented by the receiver 810.

In an optional embodiment, the processing unit 720 in the foregoing embodiment in FIG. 7 may be implemented by the receiver 810. Optionally, the receiver 810 receives related information of a transport block by using a first resource set and a second resource set, and the processor 820 determines the transport block based on the received related information of the transport block.

For a processing procedure of each unit in FIG. 8, refer to the foregoing embodiments in FIG. 1 to FIG. 7. Details are not described herein again.

Figure 9:
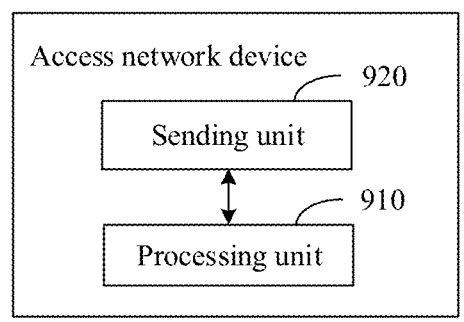
FIG. 9 is a schematic structural diagram of an access network device according to an embodiment of the present invention.

Correspondingly, an embodiment of the present invention provides an access network device, to implement the resource scheduling method provided in the foregoing embodiment. As shown in FIG. 9, the access network device includes a processing unit 910 and a sending unit 920.

The processing unit 910 of the access network device provided in this embodiment is configured to determine time-frequency resources occupied for sending a data channel in which a transport block is located, where the time-frequency resources include a first resource set and a second resource set.

The sending unit 920 is configured to send, over a first control channel, first indication information corresponding to the transport block, where the first indication information is used to indicate the first resource set and a time-frequency resource of a second control channel.

The sending unit 910 is further configured to send second indication information over the second control channel, where the second indication information is used to indicate the second resource set.

In one example, a maximum bandwidth of the first resource set in frequency domain is less than a maximum bandwidth of the second resource set in frequency domain.

Figure 10:
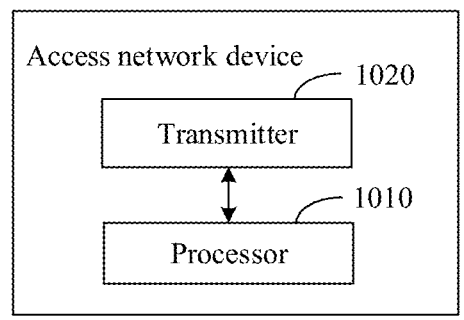
FIG. 10 is a schematic structural diagram of another access network device according to an embodiment of the present invention.

In addition, the access network device provided in this embodiment of the present invention may also be implemented in the following manner, to implement the resource scheduling method provided in the foregoing embodiment of the present invention. As shown in FIG. 10, the access network device includes a processor 1010 and a transmitter 1020.

In an optional embodiment, the processing unit 910 in the foregoing embodiment in FIG. 9 may be implemented by the processor 1010, and the sending unit 920 may be implemented by the transmitter 1020.

For a processing procedure of each unit in FIG. 10, refer to the foregoing specific embodiments in FIG. 1 to FIG. 6 and FIG. 9. Details are not described herein again.

A person skilled in the art may be further aware that the units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use a different method to implement the described function for each particular application, but it should not be considered that the implementation goes beyond the scope of this application.

A person of ordinary skill in the art may understand that all or some of the steps in the foregoing methods of the embodiments may be implemented by a program instructing a processor. The program may be stored in a computer readable storage medium. The storage medium may be a non-transitory (non-transitory) medium, for example, a random-access memory, a read-only memory, a flash memory, a hard disk, a solid state drive, a magnetic tape (magnetic tape), a floppy disk (floppy disk), an optical disc (optical disc), or any combination thereof.

The foregoing descriptions are merely specific example implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource scheduling method, wherein the method comprises:
    receiving, by user equipment over a first control channel, first indication information corresponding to a transport block, wherein time-frequency resources occupied by a data channel in which the transport block is located comprise a first resource set and a second resource set, and the first indication information indicates the first resource set and a time-frequency resource of a second control channel;
    receiving, by the user equipment, second indication information over the second control channel, wherein the second indication information indicates the second resource set; and
    determining, by the user equipment, the transport block based on the first resource set and the second resource set.

2. The method according to claim 1, wherein a maximum bandwidth of the first resource set in frequency domain is less than a maximum bandwidth of the second resource set in frequency domain.

3. The method according to claim 1, wherein the first resource set comprises m first frequency domain resource groups, wherein the m first frequency domain resource groups are in a one-to-one correspondence with m consecutive first numbers; and
    the second resource set comprises n second frequency domain resource groups, wherein the n second frequency domain resource groups are in a one-to-one correspondence with n consecutive second numbers, wherein
    an end number of the m consecutive first numbers is consecutive to a start number of the n consecutive second numbers, or a start number of the m consecutive first numbers is consecutive to an end number of the n consecutive second numbers, wherein m and n are integers greater than 0.

4. The method according to claim 3, wherein that the first indication information comprises a first index value, and the first index value is used to indicate the start number of the m consecutive first numbers and a value of m, wherein a quantity of candidate values of the first index value is predefined or configurable.

5. The method according to claim 4, wherein
    the second indication information indicates that the end number of the m consecutive first numbers is consecutive to the start number of the n consecutive second numbers, and indicate a value of n; or
    the second indication information is used to indicate that the start number of the m consecutive first numbers is consecutive to the end number of then consecutive second numbers, and indicate a value of n.

6. The method according to claim 3, wherein
    the first indication information comprises a first index value, wherein the first index value indicates the start number of the m consecutive first numbers and a value of m, wherein a quantity of candidate values of the first index value is predefined or configurable; and
    the second indication information comprises a second index value, and the second index value is used to indicate the start number of the n consecutive second numbers and a value of n, wherein a quantity of candidate values of the second index value is predefined or configurable.

7. The method according to claim 3, wherein a correspondence between the first index value and the m consecutive first numbers, a correspondence between the second index value and the m consecutive first numbers, and a correspondence between the second index value and the n second numbers are determined based on a pre-configured tree structure relationship.

8. The method according to claim 3, wherein each of the m first frequency domain resource groups comprises k1 frequency domain resource units, and each of the n second frequency domain resource groups comprises k2 frequency domain resource units, wherein
    k1 and k2 are determined based on an access bandwidth of the user equipment in frequency domain, k1 and k2 are positive integers greater than or equal to 1, and k1 is less than or equal to k2.

9. The method according to claim 8, wherein k1 is determined by a size of the frequency domain resource occupied by the second control channel.

10. The method according to claim 1, wherein the first resource set comprises m first frequency domain resource groups, and the m first frequency domain resource groups are in a one-to-one correspondence with m first numbers; and
    the second resource set comprises n second frequency domain resource groups, wherein the n second frequency domain resource groups are in a one-to-one correspondence with n second numbers, wherein
    the m first numbers and the n second numbers meet one or more of the following conditions:
    the m first numbers are discrete numbers;
    the n second numbers are discrete numbers;
    the m first numbers are consecutive numbers, the n second numbers are consecutive numbers, and an end number of the m first numbers is consecutive to a start number of the n second numbers, or a start number of the m first numbers is consecutive to an end number of the n second numbers; and
    the m first numbers are consecutive numbers, the n second numbers are consecutive numbers, and the end number of the m first numbers is inconsecutive to the start number of the n second numbers, or the start number of the m first numbers is inconsecutive to the end number of the n second numbers, wherein m and n are integers greater than 0.

11. The method according to claim 10, wherein
    the first indication information comprises a first bitmap, wherein the first bitmap indicates locations of the m first frequency domain resource groups; and
    the second indication information comprises a second bitmap, wherein the second bitmap indicates locations of the n second frequency domain resource groups.

12. The method according to claim 10, wherein when the m first numbers and then second numbers meet the condition that the m first numbers are consecutive numbers, the n second numbers are consecutive numbers, and the end number of the m first numbers is inconsecutive to the start number of the n second numbers, or the start number of the m first numbers is inconsecutive to the end number of the n second numbers, the first indication information comprises a first index value, and the first index value indicates the start number of the m consecutive first numbers and a value of m, wherein a quantity of candidate values of the first index value is predefined or configurable; and the second indication information comprises a second index value, and the second index value indicates the start number of the n consecutive second numbers and a value of n, wherein a quantity of candidate values of the second index value is predefined or configurable.

13. The method according to claim 10, wherein when the m first numbers and the n second numbers meet a condition that the m first numbers are discrete numbers and the n second numbers are consecutive numbers, that the first indication information is used to indicate the first resource set comprises:

the first indication information comprises a first bitmap, and the first bitmap is used to indicate locations of the m first frequency domain resource groups; and that the second indication information is used to indicate the second resource set comprises:

the second indication information comprises a second index value, and the second index value indicates the start number of the n consecutive second numbers and a value of n, wherein a quantity of candidate values of the second index value is predefined or configurable.

14. The method according to claim 10, wherein when the m first numbers and the n second numbers meet a condition that the m first numbers are consecutive numbers and the n second numbers are discrete numbers, the first indication information comprises a first index value, and the first index value indicates the start number of the m consecutive first numbers and a value of m, wherein a quantity of candidate values of the first index value is predefined or configurable; and the second indication information comprises a second bitmap, and the second bitmap is used to indicate locations of the n second frequency domain resource groups.

15. A resource scheduling method, wherein the method comprises:

determining, by an access network device, time-frequency resources occupied for sending a data channel in which a transport block is located, wherein the time-frequency resources comprise a first resource set and a second resource set;

sending, by the access network device over a first control channel, first indication information corresponding to the transport block, wherein the first indication information indicates the first resource set and a time-frequency resource of a second control channel; and sending, by the access network device, second indication information over the second control channel, wherein the second indication information indicates the second resource set.

16. The method according to claim 15, wherein a maximum bandwidth of the first resource set in frequency domain is less than a maximum bandwidth of the second resource set in frequency domain.

17. User equipment, wherein the user equipment comprises:

receiver, configured to receive, over a first control channel, first indication information corresponding to a transport block, wherein time-frequency resources occupied by a data channel in which the transport block is located comprise a first resource set and a second resource set, wherein the first indication information indicates the first resource set and a time-frequency resource of a second control channel, wherein the receiver is further configured to receive second indication information over the second control channel, wherein the second indication information is used to indicate the second resource set; and a processor, configured to determine the transport block based on the first resource set and the second resource set.

18. The user equipment according to claim 17, wherein a maximum bandwidth of the first resource set in frequency domain is less than a maximum bandwidth of the second resource set in frequency domain.

19. The user equipment according to claim 17, wherein the first resource set comprises m first frequency domain resource groups, and the m first frequency domain resource groups are in a one-to-one correspondence with m consecutive first numbers; and the second resource set comprises n second frequency domain resource groups, and the n second frequency domain resource groups are in a one-to-one correspondence with n consecutive second numbers, wherein an end number of the m consecutive first numbers is consecutive to a start number of the n consecutive second numbers, or a start number of the m consecutive first numbers is consecutive to an end number of the n consecutive second numbers, wherein m and n are integers greater than 0.

20. The user equipment according to claim 19, wherein the first indication information comprises a first index value, and the first index value is used to indicate the start number of the m consecutive first numbers and a value of m, wherein a quantity of candidate values of the first index value is predefined or configurable.

* * * * *